(12) United States Patent
Sato et al.

(10) Patent No.: US 9,513,477 B2
(45) Date of Patent: Dec. 6, 2016

(54) VEHICULAR HEADS-UP DISPLAY DEVICE

(75) Inventors: Genichiro Sato, Nagaoka (JP);
Masatoshi Azuma, Nagaoka (JP);
Daisuke Tsukuda, Nagaoka (JP);
Masao Itagaki, Nagaoka (JP)

(73) Assignee: NIPPON SEIKI CO., LTD., Niigata (JP)

( * ) Notice: Subject to any disclaimer, the term of this patent is extended or adjusted under 35 U.S.C. 154(b) by 272 days.

(21) Appl. No.: 13/814,410

(22) PCT Filed: Jul. 19, 2011

(86) PCT No.: PCT/JP2011/066296
§ 371 (c)(1),
(2), (4) Date: Feb. 5, 2013

(87) PCT Pub. No.: WO2012/026242
PCT Pub. Date: Mar. 1, 2012

(65) Prior Publication Data
US 2013/0135748 A1 May 30, 2013

(30) Foreign Application Priority Data
Aug. 26, 2010 (JP) ................................. 2010-189217

(51) Int. Cl.
*G02B 27/01* (2006.01)
*G02B 5/02* (2006.01)
(52) U.S. Cl.
CPC ............. *G02B 27/0101* (2013.01); *G02B 5/02* (2013.01); *G02B 2027/0118* (2013.01)
(58) Field of Classification Search
CPC .............. G02B 2027/0105; G02B 2027/0109; G02B 27/00; G02B 27/01; G02B 27/0101; G02B 2027/0118; G02B 5/02; B60K 35/00
USPC .................... 359/13, 14, 630, 631, 629, 599
See application file for complete search history.

(56) References Cited

U.S. PATENT DOCUMENTS

| 5,128,659 A * | 7/1992 | Roberts .............. G02B 27/0101 340/980 |
| 2005/0264889 A1* | 12/2005 | Gotoh .................. G02B 6/0001 359/599 |
| 2011/0261465 A1* | 10/2011 | Moussa et al. ............... 359/630 |

FOREIGN PATENT DOCUMENTS

| JP | 04-184481 A | 7/1992 |
| JP | 05-085224 | 4/1993 |

(Continued)

OTHER PUBLICATIONS

Sonobe et al, "Virtual Image Type Meter and Mirror Holder Used Therefor", JP 2005055663 A, English machine translation.*

(Continued)

*Primary Examiner* — Wen Huang
(74) *Attorney, Agent, or Firm* — McDermott Will & Emery LLP (57) ABSTRACT

Provided is a vehicular heads-up display device with which it is possible to avoid burn-in of an internal component upon a reflecting member by exterior light, improving display quality. A vehicular heads-up display device, comprising a case body (50) whereon an aperture part (51c) is disposed and a light-emitting body (30) that is housed within the case body (50) reflects emitted light L that is emitted by the light-emitting body (30) externally to the case body (50) via the aperture part (51c) and reflects said emitted light L from the windshield (13), causing the driver (14) to have sight of the virtual image V that is obtained by said reflection. The vehicular heads-up display device further comprises a semi-transmissible cover (55) installed in the aperture part (51c), and a dispersal means (58) is disposed between the light emitting body (30) and the cover (55), for dispersing exterior light that enters the case body (50) via the cover (55).

2 Claims, 10 Drawing Sheets

(56) References Cited

FOREIGN PATENT DOCUMENTS

| | | | |
|---|---|---|---|
| JP | 2005-055663 A | | 3/2005 |
| JP | 2005055663 A | * | 3/2005 |
| JP | 2008-268680 A | | 11/2008 |
| JP | 2008268680 A | * | 11/2008 |
| JP | 2009-075514 A | | 4/2009 |
| JP | 2009-128884 A | | 6/2009 |
| JP | 2009-251194 A | | 10/2009 |
| WO | WO 2010066818 A1 | * | 6/2010 |

OTHER PUBLICATIONS

Furusawa, "Display Device", JP2008268680A, machine translation.*
International Search Report issued in International Patent Application No. PCT/JP2011/066296 dated Sep. 6, 2011.
Japanese Examination Report issued in Japanese Application No. 2010-189217 dated Apr. 15, 2014.

* cited by examiner

VEHICULAR HEADS-UP DISPLAY DEVICE

RELATED APPLICATIONS

This application is the U.S. National Phase under 35 U.S.C. §371 of International Application No. PCT/JP2011/066296, filed on Jul. 19, 2011, which in turn claims the benefit of Japanese Application No. 2010-189217, filed on Aug. 26, 2010, the disclosures of which Applications are incorporated by reference herein.

TECHNICAL FIELD

The present invention relates to a vehicular heads-up display device configured to cause outgoing light emitted from a light-emitting body to reflect on a windshield, which is a reflecting member, of a vehicle and cause a virtual image obtained by the reflection to be visually identified by a user of the vehicle.

BACKGROUND ART

In the related art, as a vehicular heads-up display device of this type, for example, the one disclosed in Patent Literature 1 shown below is known. The vehicular heads-up display device described in Patent Literature 1 is mounted inside an instrument panel (hereinafter, referred to as "INP") of the vehicle, and includes a liquid crystal display configured to issue travelling information relating to travel of the vehicle as display light, a light source (a light-emitting body) composed of an LED disposed adjacent to the liquid crystal display, a circuit board on which a wiring pattern for mounting the light source is formed, a reflection mirror configured to reflect the display light emitted by the liquid crystal display and outgoing light (illumination light) emitted from the light source, and a unit case (case body) configured to house the liquid crystal display, the light source, the circuit board, and the reflection mirror, and an opening to allow the display light and the outgoing light described above reflected by the reflection mirror to pass therethrough is formed on the upper end side of the unit case so as to open.

Then, the vehicular heads-up display device configured as described above is configured to cause the display light from the liquid crystal display reflected by the reflection mirror and the outgoing light from the light source to go out to the outside of the unit case via the opening provided in the unit case, and to reflect on a windshield of the vehicle as a reflecting member toward a driver, and allows a user of the vehicle as a driver to visually identify a virtual image obtained by this reflection.

In this case, the vehicular heads-up display device includes control means including a microcomputer configured to cause the liquid crystal display to perform a display operation and cause the light source to perform a lighting operation mounted on the circuit board, and such control means causes the liquid crystal display to perform the display operation to display also a signage "CHECK" in addition to the traveling information (vehicle speed display) on the liquid crystal display and, simultaneously, causes the light source to perform the lighting operation to display a circular alarm sign, described later, as part of the virtual image upon reception of a state signal indicating that only a small amount of fuel remains for example.

Then, the light source is illuminated simultaneous with the emission of vehicle speed display light and signage display light such as "CHECK" from the liquid crystal display, and the vehicle sped display light, the signage display light, and the outgoing light emitted from the light source are reflected toward the driver through a reflection mirror, the opening of the unit case, and the windshield, whereby the driver is capable of observing the virtual image composed of the vehicle speed display, the signage display such as "CHECK", and the circular alarm sign with a landscape superimposed thereon. The alarm sign displayed as part of the virtual image is displayed for letting the driver to reliably notify the fact that the signage display such as "CHECK" is displayed.

CITATION LIST

Patent Literature

PTL: JP-A-4-184481

SUMMARY OF INVENTION

Solution to Problem

However, in the case of the vehicular heads-up display device in Patent Literature 1 described above, there is a problem that sun light (outside light) incident on and entering the unit case through the opening formed on the upper end side of the unit case illuminates internal components (the circuit board formed with the wiring pattern thereon, the light source, or the like) housed in the unit case and, by the reflected light therefrom, the internal components are reflected as a background on the front glass (reflecting member) as a residual image, which may bother the driver.

In addition, since the alarm sign described above is displayed only when reminding the driver to pay attention, the rate of awareness by the driver is low unlike the vehicle speed display which is always displayed, and hence misidentification of the image of the internal components reflected as the background due to the influence of the outside light and the image of the alarm sign may occur.

Accordingly, in order to solve the above-described problem, it is an object of the invention to provide a vehicular heads-up display device which is capable of preventing reflection of internal components as a background on a reflecting member due to outside light, and improving a display quality.

Solution to Problem

The invention provides a vehicular heads-up display device including: a case body formed with an opening; and a light-emitting body housed in the case body, wherein an outgoing light from the light-emitting body is caused to go out toward the outside of the case body through the opening and reflected by a predetermined reflecting member so as to allow a user of a vehicle to visually identify a virtual image obtained by the reflection, including: a semi-permeable cover disposed on the opening; and a diffusing means configured to diffuse outside light incident on and entering the case body through the cover between the light-emitting body and the cover.

The invention is characterized by including a display portion having a predetermined display design and a background portion forming a background of the display portion on a front surface or a back surface of the cover.

The invention is also characterized in that the diffusing means is provided on the back side of the cover so as to cover the display portion and the background portion or so as to be interposed between the cover and the background portion.

The invention is also characterized by including a display member provided with the display portion having a predetermined display design and the background portion forming the background of the display portion on a light-permeable substrate between the light-emitting body and the cover, and in that the diffusing means is provided between the substrate and the cover.

The invention is also characterized in that the diffusing means is provided between the light-emitting body and the cover so as to be apart from the cover, and the diffusing means is provided with the display portion having a predetermined display design and the background portion forming a background of the display portion.

The invention is also characterized in that the color tone of the cover includes a dark color.

Advantageous Effects of Invention

According to the invention, an initial object is achieved and a vehicular heads-up display device which is capable of preventing reflection of internal components as a background on a reflecting member due to outside light, and improving display quality is provided.

DESCRIPTION OF EMBODIMENTS

First Embodiment

Referring now to FIG. 1 to FIG. 5, an embodiment in which the invention is applied to a vehicular heads-up display device will be described below.

Figure 1:
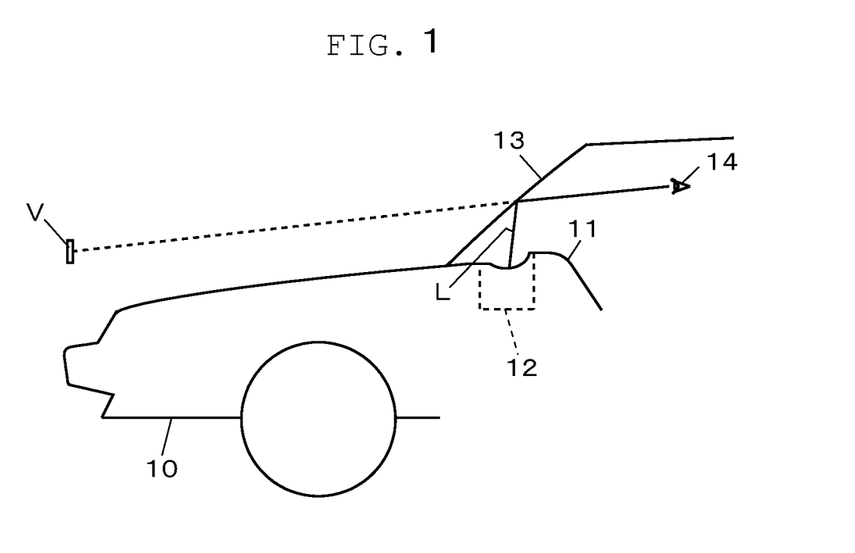
FIG. 1 is a schematic drawing illustrating a vehicular heads-up display device according to a first embodiment of the invention.

The vehicular heads-up display device is configured to cause outgoing light L emitted from a light-emitting device 12 disposed inside an INP 11, which is a reflecting member, of a vehicle 10 to be reflected by a windshield 13 of the vehicle 10 toward a driver (user) 14 of the vehicle 10 to display a virtual image V as illustrated in FIG. 1. In other words, the vehicular heads-up display device is configured to allow the outgoing light L emitted from alight source, described later, of the light-emitting device 12 to go out toward the windshield 13 (the reflecting member), and allow the driver 14 to visually identify the virtual image V obtained by the outgoing light. Accordingly, the driver 14 is allowed to observe the virtual image V displayed in the forward front of a driver's seat with a landscape superimposed thereon.

Figure 2:
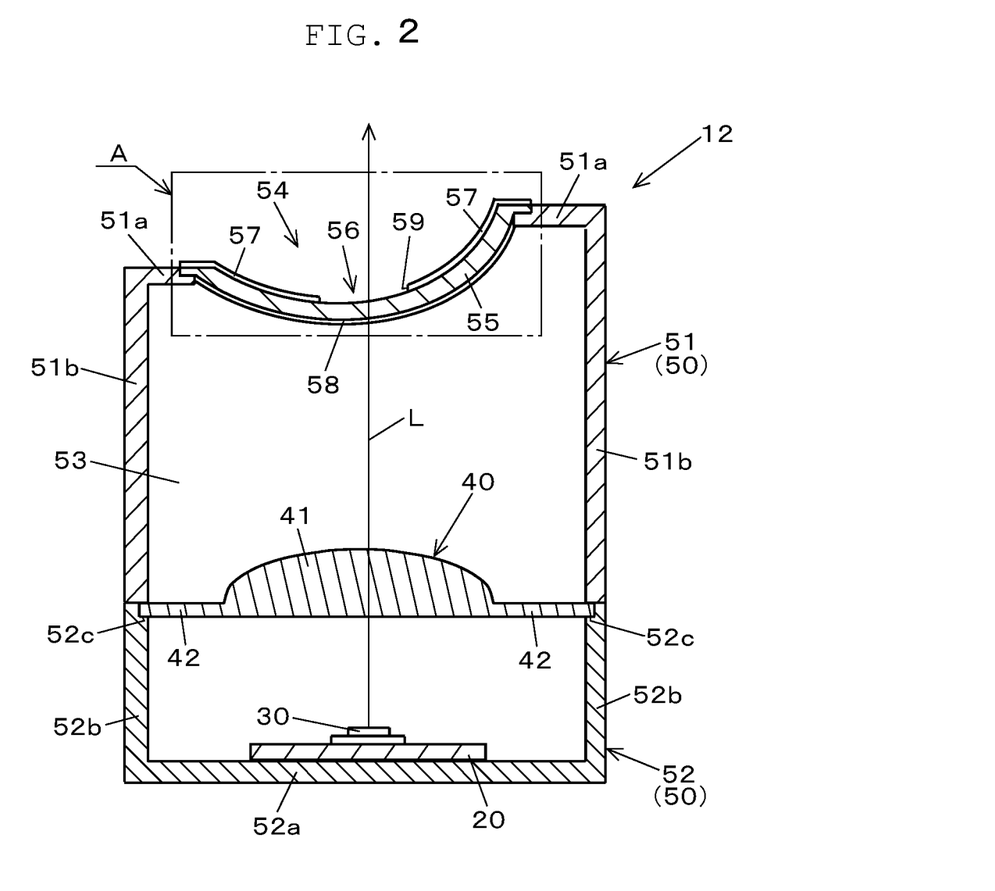
FIG. 2 is a cross-sectional view illustrating a light-emitting device according to the same embodiment.

The light-emitting device 12 mainly includes a circuit board 20, a light source 30 as a light-emitting body mounted (disposed) on the circuit board 20, a lens member 40 configured to focus the outgoing light emitted from the light source 30, and a case body 50 which constitutes an outer case of the light-emitting device 12 as illustrated in FIG. 2 in detail.

The circuit board 20 is formed of a hard circuit board provided with, for example, a predetermined wiring pattern thereon, and the light source 30 is mounted on the wiring pattern. The circuit board 20 as described above is mounted on a bottom wall portion provided on a lower case, described later, of the case body 50.

The light source 30 includes, for example, a chip-type light-emitting diode emitting red light, and is a light-emitting body that supplies illumination light (the outgoing light) to the lens member 40.

The lens member 40 is formed of a translucent synthetic resin, and includes a convex lens 41 having a flat surface on the back side (the light source 30 side) and a convex surface on the front side opposite from the back side and a pair of flanges 42 extending in the periphery of the convex lens 41, and has a function as a light-gathering member configured to gather the outgoing light emitted from the light source 30. In other words, the lens member 40 (convex lens 41) is configured to give a predetermined refraction to the outgoing light so as to let parallel outgoing light which is a substantially parallel pencil go out toward an opening formed so as to open on an upper case, described later, of the case body 50.

The case body 50 is formed of, for example, a black light-shielding synthetic resin material, and in this case, is divided into an upper case 51 and a lower case 52. The upper case 51 and the lower case 52 are both formed to have a substantially concave shape in cross section, and the circuit board 20, the light source 30, and the lens member 40 are accommodated in a space portion 53 (in other words, in the interior of the case body 50) as an internal space defined by the upper case 51 and the lower case 52.

The upper case 51 has a configuration in which a front wall portion 51a positioned on the windshield 13 side and a substantially frame-shaped first side wall portion 51b formed so as to extend downward (toward the lower case 52) from a peripheral edge of the front wall portion 51a are formed integrally. Then, an opening 51c formed of a substantially rectangular opening window is formed so as to open at a substantially center portion of the front wall portion 51a of the upper case 51 (see FIG. 3), and a display member 54 formed of a design panel, which is a separate member from the case body 50, is disposed on the opening 51c so as to close the opening 51c.

Figure 3:
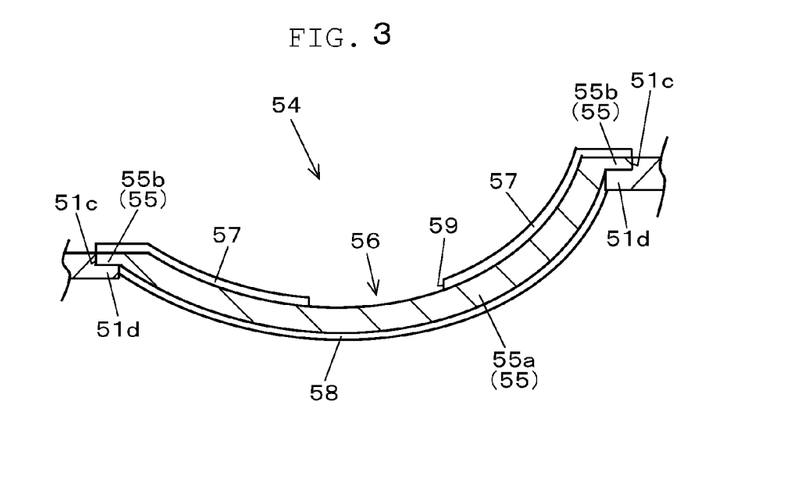
FIG. 3 is an enlarged cross-sectional view illustrating a portion A in FIG. 2 in an enlarged scale.

In this case, the front wall portion 51a is provided with a holding portion 51d having a brim shape formed so as to project inward from the opening 51c (that is, from the inner wall surface of the front wall portion 51a) so as to hold a flange portion, described later, of the display member 54 at a lower end side thereof, and the display member 54 (that is, a cover 55 described later as a base material of the display member 54) is disposed on the opening 51c so as to close the opening 51c by the flange portion held by the holding portion 51d.

The display member 54 includes a semipermeable cover 55 formed of a translucent synthetic resin plate (or a glass plate) having, for example, a dark smoke color tone, a display portion 56 formed of a predetermined display design (permeable design portion) provided on the front surface of the cover, a background portion 57 formed of a light-shielding layer provided on the front surface of the cover 55 so as to form a background of the display portion 56, and a diffusing sheet (diffusing means) 58 provided on the back surface of the cover 55 between the light source 30 and the cover 55 in order to cause the sun light (outside light) incident on and entering the space portion 53 (the interior of the case body 50) through the display portion 56 and the cover 55 to diffuse (diffusely reflect), and the diffusing sheet 58 is stuck to the cover 55 in tight contact with the back surface of the cover 55 using securing means as needed as illustrated in FIG. 3.

The cover 55 has a dark color tone, and has a configuration including a curved surface portion 55a formed into a curved surface shape (curved shape) having a predetermined curvature, and a flange portion 55b having a brim shape positioned around the curved surface portion 55a so as to surround the curved surface portion 55a formed integrally to each other.

For reference, the curved surface shape of the curved surface portion 55a in this case is set to have the curvature which prevents the reflected light therefrom from being directed toward the driver 14 side via the windshield 13, for example, when sun light (outside light) is impinged on the curved surface portion 55a and reflected therefrom. In other words, this means that the curved surface portion 55a is formed to have the curved surface shape which prevents the reflected light reflected upon reception of the outside light from being directed toward the driver 14 side.

The display portion 56 having a permeable design portion is formed of a void portion 59 where the background portion 57 is not formed partway so as to expose part of the cover 55, and is formed at a substantially center portion of the cover 55. For reference, in this example, the design shape of the display portion 56 provided at a position of the void portion 59, which is an area from which the background portion 57 is removed is a circular shape. However, it is needless to say that any shapes other than the circular shape may also be employed as the design shape of the display portion 56.

The background portion 57 composed of a light-shielding layer is formed of a printed layer formed on the front surface of the cover 55 by printing and is formed by printing by means of screen printing or the like using black ink, for example. Then, the display portion 56 is formed as the void portion 59 where the printed layer which forms the background portion 57 is not formed by printing a portion corresponding to the display portion 56 by hollow printing when printing the background portion 57.

In contrast, the lower case 52 has a configuration including a bottom wall portion 52a which is a placing portion for placing the circuit board 20 on which the light source 30 is mounted, and a substantially frame-shaped second side wall portion 52b which becomes paired with the first side wall portion 51b of the upper case 51 formed integrally with each other, and the second side wall portion 52b is provided with a supporting portion 52c having a step shape for supporting a peripheral edge of the flanges 42 of the lens member 40 at an upper end portion thereof.

Figure 4:
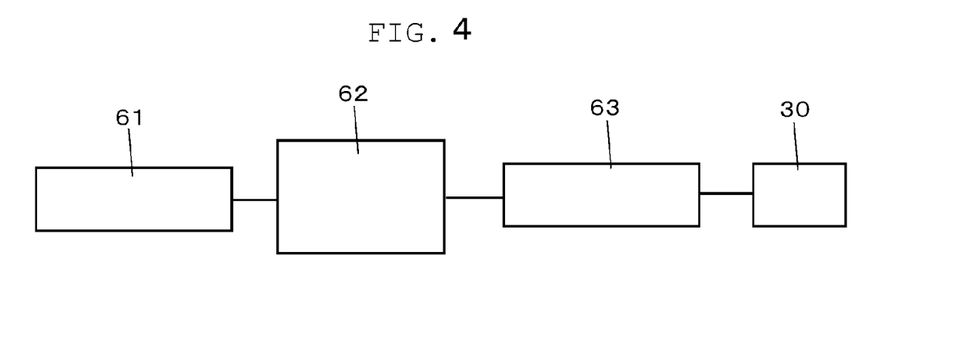
FIG. 4 is a block diagram illustrating an electric configuration of the vehicular heads-up display device according to the same embodiment.
Figure 5:
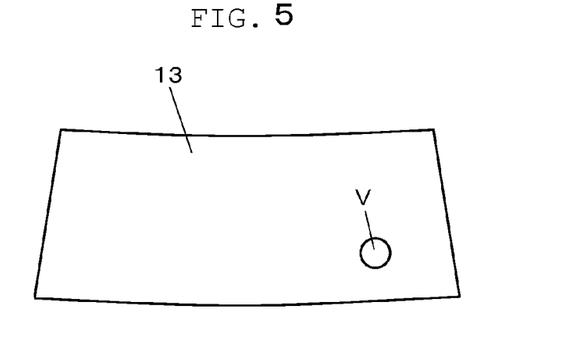
FIG. 5 is a front view of a windshield in a state in which a virtual image is displayed according to the same embodiment.

The respective portions described above constitute the light-emitting device 12. Subsequently, an electric configuration of the vehicular heads-up display device according to this embodiment will be described with reference to FIG. 4. In FIG. 4, reference numeral 61 designates vehicle speed detecting means, reference numeral 62 designates control means, reference numeral 63 designates a light source drive circuit, and reference numeral 30 designates the light source.

The vehicle speed detecting means 61 includes a vehicle speed sensor for detecting the speed of the vehicle, and is configured to detect a vehicle-speed detection signal according to an operating state of the vehicle and output the signal to the control means 62.

The control means 62 is composed of a microcomputer including a ROM in which a program of a processing operation is stored, a RAM configured to temporarily store a computed value, and a CPU for executing the program and, in this case, is mounted on a wiring board, not illustrated, fixedly disposed in the light-emitting device 12 (the space portion 53).

The control means 62 as described above outputs a command signal that controls the operation of the light source 30 on the basis of the vehicle speed detection signal from the vehicle speed detecting means 61. Specifically, lighting control of the light source 30 is performed as described below on the basis of the vehicle speed detection signal. In other words, in the case of this example, the control means 62 outputs a command signal for causing the light source 30 to perform a lighting operation only when the value of the vehicle speed detection signal input according to the operating state of the vehicle exceeds a predetermined threshold value (for example, 100 km per hour).

The command signal output from the control means 62 is input to the light source drive circuit 63 configured to drive the light source 30. The light source drive circuit 63 drives the light source 30 upon reception of the command signal, whereby the light source 30 is lit.

Then, when the light source 30 is lit at a vehicle speed exceeding 100 km per hour, the outgoing light L emitted from the light source 30 passes through the convex lens 41, and then goes out from the convex lens 41 as the parallel outgoing light. The parallel outgoing light (that is, the outgoing light L from the light source 30) as described above goes out to the outside of the case body 50 via the display member 54 disposed in the opening 51c.

At this time, the parallel outgoing light (the outgoing light L from the light source 30) passes through the diffusing sheet 58, the curved surface portion 55a (the cover 55), and the circular display portion 56, goes out toward the windshield 13 side, and further is reflected by the windshield 13 toward the driver 14 side. The driver 14 is capable of visually identifying a circular red light-emitting image (the virtual image V) corresponding to the design shape of the display portion 56 obtained by the reflection (see FIG. 5). In this manner, according to the invention, the alarm sign indicating an overspeed displayed for the driver 14 using the circular red light-emitting image (the virtual image V) reminds the driver 14 to pay attention.

For reference, the brightness of the parallel outgoing light (the outgoing light L) is attenuated when passing through the curved surface portion 55*a* (the cover 55) having a smoke color tone. However, since the vehicular heads-up display device of the invention is intended to remind the driver to pay attention, if the brightness is attenuated, the display only becomes cloudy, but the display quality is not impaired. Also, in this example, the display portion 56 and the background portion 57 are formed on the front surface of the cover 55. For example, however, a configuration in which the display portion 56 and the background portion 57 are eliminated, and the parallel outgoing light (the outgoing light L) passing through the cover 55 goes out toward the windshield 13 side without passing through the display portion 56.

Subsequently, how the sun light (the outside light) travels in the case body 50 will be described. The outside light incident on and entering the case body 50 is reflected by the curved surface at the portion of the curved surface portion 55*a* corresponding to the void portion 59 toward the windshield 13 side and then is attenuated when part of the light passes further the portion of the curved surface portion 55*a* corresponding to the void portion 59. Then, part of the outside light passing through the portion of the curved surface portion 55*a* corresponding to the void portion 59 is diffused (diffusely reflect) by the diffusing sheet 58 provided on the back surface of the curved surface portion 55*a* (the cover 55), and hence in this configuration, internal components such as the circuit board 20 or the light source 30 housed in the case body 50 are not illuminated. Therefore, the reflection of the internal components as a background on the windshield (the reflecting member) 13 due to the outside light is prevented, the driver 14 is capable of visually identifying the red light-emitting image (the virtual image V) having no remaining image, so that the vehicular heads-up display device improved in display quality may be provided.

As described above, in this embodiment, in the vehicular heads-up display device including the case body 50 formed with the opening 51*c* and the light source (light-emitting body) 30 housed in the case body 50, and configured to cause the outgoing light L from the light source 30 to go out to the outside of the case body 50 via the opening 51*c* and be reflected by the windshield 13 and allow the driver 14 as an user of the vehicle to visually identify the virtual image V obtained by this reflection, the semi-permeable cover 55 disposed on the opening 51*c* is provided, and the diffusing sheet 58 as the diffusing means configured to diffuse the outside light incident on and entering the case 50 through the cover 55 is provided between the light source 30 and the cover 55.

Therefore, a configuration in which part of the outside light incident on and entering the case body 50 via the cover 55 (or the display portion 56 and the cover 55) is diffused (diffusely reflected) by the diffusing sheet 58 and does not positively illuminate the internal components such as the circuit board 20 and the light source 30 housed in the case body 50 is achieved, so that the reflection of the internal components as a background on the windshield 13 by the outside light is prevented, and improvement of the display quality of the virtual image V is enabled.

Also, in this embodiment, the front surface of the cover is provided with the display portion 56 having a substantially circular display design and the background portion 57 formed of the light-shielding layer forming the background of the display portion 56, whereby the parallel outgoing light (the outgoing light emitted from the light source 30) goes out through the cover 55 and the display portion 56 as a substantially circular permeable design portion to the windshield 13. Therefore, the outline of the virtual image V (the circular red light-emitting image) reflected on the windshield 13 becomes clear, so that improvement of the display quality of the virtual image V is enabled.

Also, in this embodiment, the example in which the display portion 56 is formed as the void portion 59 where the background portion 57 is not formed when forming the background portion 57 by printing has been described. However, for example, the display portion 56 may be formed as a printed layer having a predetermined color such as white.

Also, in this embodiment, the example in which the diffusing means 58 is formed of a diffusing sheet stuck to the back surface of the cover 55 has been described. However, the diffusing means 58 may be realized, for example, by grain finish or the like applied on the back surface of the cover 55 instead of the diffusing sheet.

Also, in this embodiment, the example in which the background portion 57 is formed on the front surface of the cover 55 (that is, the front surface of the curved surface portion 55*a* and the front surface of the flange portion 55*b*) by printing has been described. However, for example, the background portion 57 may be formed only on the front surface of the curved surface portion 55*a* of the cover 55 by printing.

Figure 6:
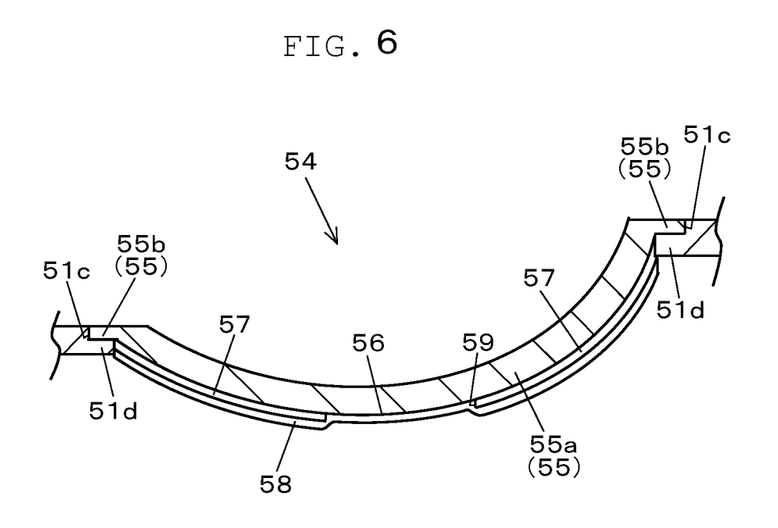
FIG. 6 is a cross-sectional view of a display member according to a modification of the same embodiment.
Figure 7:
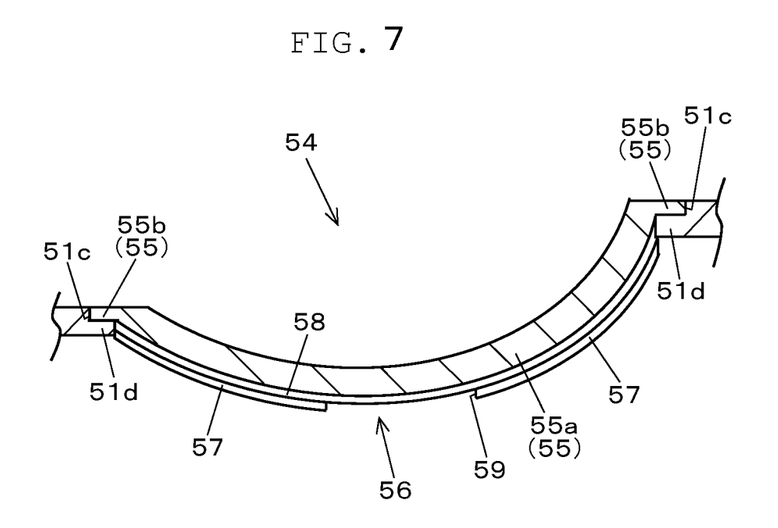
FIG. 7 is a cross-sectional view of a display member according to another modification of the same embodiment.

Also, in this embodiment, the example in which the background portion 57 is formed on the front surface of the cover 55 and the display portion 56 is formed in the area other than the background portion 57, and the diffusing sheet 58 is stuck on the back surface of the cover 55 has been described. For example, however, even when the background portion 57 is formed on the back surface of the cover 55 instead of the front surface of the cover 55 and the diffusing sheet 58 is provided on the back side of the cover 55 so as to cover the background portion 57 and the display portion 56 as a modification of this embodiment as illustrated in FIG. 6, or even when the diffusing sheet 58 is stuck on the back surface of the cover 55 and the background portion 57 is formed so as to be laminated on the back surface of the diffusing sheet 58 as another modification of this embodiment as illustrated in FIG. 7, the same effects and advantages as in this embodiment described above are achieved. In FIG. 7, the diffusing sheet 58 is provided on the back side of the cover 55 so as to be interposed between the cover 55 and the background portion 57, and the display portion 56 (the void portion 59) is provided as an exposed portion from which the back side of the diffusing sheet 58 is partly exposed.

Second Embodiment

Figure 8:
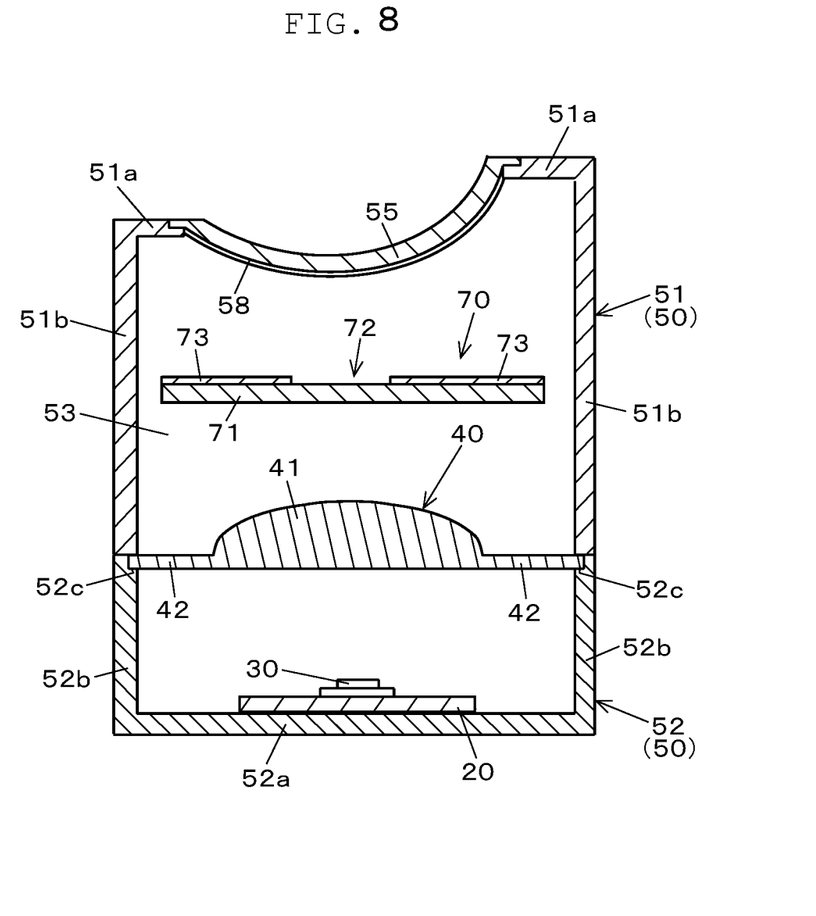
FIG. 8 is a cross-sectional view illustrating a light-emitting device according to a second embodiment of the invention.

Subsequently, referring now to FIG. 8, a second embodiment of the invention will be described, and the same or corresponding parts are designated by the same reference signs as those of the first embodiment described above, and detailed description thereof will be omitted. The second embodiment is configured in such a manner that the background portion 57 formed on the front surface of the semi-permeable cover 55 having a smoked color tone is eliminated, and a design panel (display member) 70 is arranged between the light source 30 (the lens member 40) and the cover 55.

In other words, in the second embodiment, the cover 55 (not formed with the background portion 57) is disposed on the opening 51c, and the diffusing sheet 58 as diffusing means configured to diffuse the outside light incident on and entering the case body 50 through the cover 55 is stuck on the back side of the cover 55, and the design panel 70 is arranged between the light source 30 an the cover 55.

The design panel 70 configured in this manner is formed of a translucent (light permeable) substrate 71 as a base material formed of an acrylic resin, and includes a display portion 72 having a predetermined display design on the front surface of the substrate 71, and a background portion 73 forming a background of the display portion 72. The display portion 72 has a design shape equivalent to the display portion 56 employed in the first embodiment, and the background portion 73 has the design shape equivalent to the background portion 57 employed in the first embodiment. For reference, in this case, the display member 70 is fixed to the case body 50 (the upper case 51) using fixing means as needed.

In the second embodiment as well as described above, part of the outside light incident on and entering the case body 50 is diffused (diffusely reflected) by the diffusing sheet 58 provided on the back side of the cover 55 between the substrate 71 and the cover 55, and hence in this configuration, the internal components such as the circuit board 20, the light source 30, and the display portion 72 housed in the case body 50 are not illuminated. Therefore, the reflection of the internal components as a background on the front glass (reflecting member) 13 due to the outside light is prevented, the driver 14 is capable of visually identifying the red light-emitting image (the virtual image V) having no remaining image, so that the same effects and advantages as in the first embodiment are obtained.

Also, in the second embodiment, the example in which the substrate 71 is formed of a light-permeable acrylic resin has been described. However, for example, the substrate 71 may be formed of a semi-permeable synthetic resin plate (or the glass plate) having a smoke color tone.

Also, in the second embodiment, the example in which the background portion 73 is formed on the front surface of the substrate 71 has been described. However, for example, the background portion 73 may be formed on a back surface of the substrate 71 instead of the front surface of the substrate 71. At this time, it is needless to say that the display portion 72 is formed at a substantially center portion of the back surface of the substrate 71.

In the second embodiment, the example in which the display member 70 arranged between the light source 30 and the cover 55 is formed of the design panel having the display portion 72 and the background portion 73 has been described. However, the design panel may be replaced by a known dot-matrix liquid crystal display panel. In this case, a display portion corresponding to the display portion 72 having a circular design shape may be formed at a substantially center portion of the liquid crystal display panel.

Third Embodiment

Figure 9:
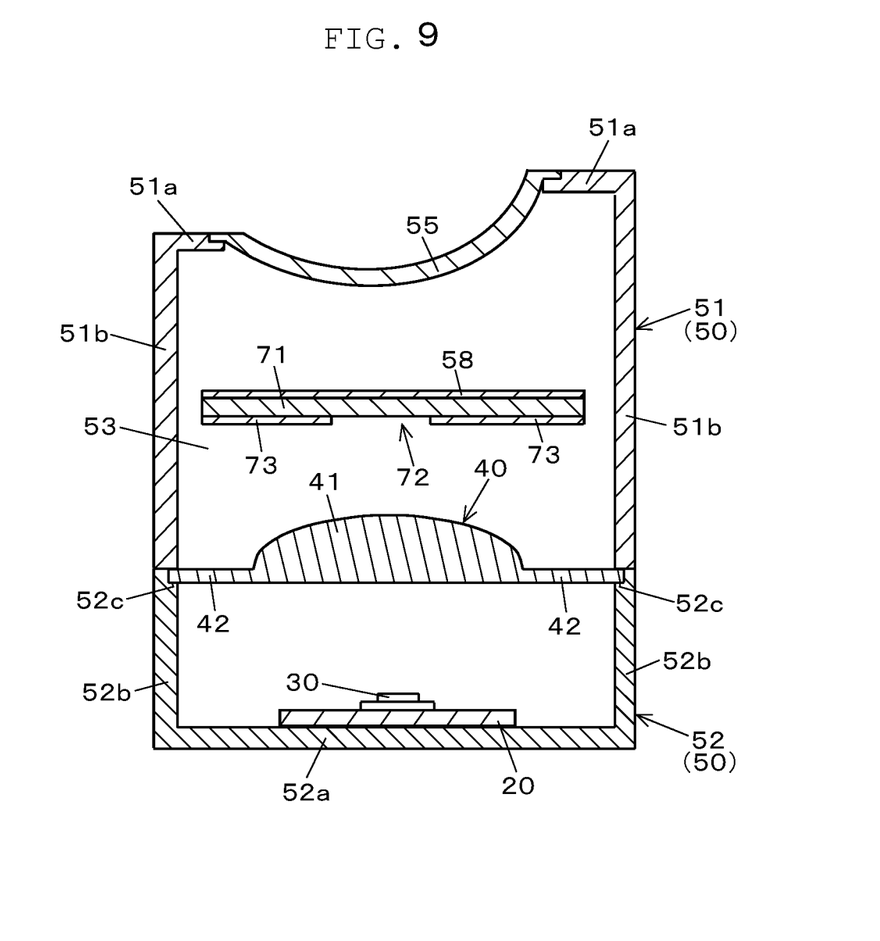
FIG. 9 is a cross-sectional view illustrating a light-emitting device according to a third embodiment of the invention.

Subsequently, referring now to FIG. 9, a third embodiment of the present invention will be described, and the same or corresponding parts are designated by the same reference signs as those of the first and second embodiments described above, and detailed description thereof will be omitted. In the third embodiment, with the configuration of the second embodiment as a basic configuration, the background portion 73 provided on the design panel 70 is formed on the back surface of the substrate 71 and the diffusing sheet 58 is provided on the front surface of the substrate 71 instead of the back surface of the cover 55 so as to be in tight contact therewith.

In the third embodiment as well, part of the outside light incident on and entering the case body 50 is attenuated and reaches the design panel 70 when passing through the cover 55, and part of the outside light reaching the design panel 70 is diffused (diffusely reflected) by the diffusing sheet 58 provided on the front surface of the substrate 71 between the substrate 71 and the cover 55, and hence with this configuration, the internal components such as the circuit board 20 and the light source 30 housed in the case body 50 are not illuminated. Therefore, the reflection of the internal components as a background on the windshield (the reflecting member) 13 due to the outside light is prevented, the driver 14 is capable of visually identifying the red light-emitting image (the virtual image V) having no remaining image, so that the same effects and advantages as in the first and second embodiments may be obtained.

According to the configuration of the third embodiment, the background portion 73 is provided on the back surface of the substrate 71 and the diffusing sheet 58 is stuck on the front surface of the substrate 71. However, for example, a configuration in which the background portion 73 is provided on the front surface of the substrate 71 and the diffusing sheet 58 as the diffusing means is overlapped on the front side of the substrate 71 so as to cover the background portion 73 and the display portion 72 provided in the area other than the background portion 73 is also applicable.

Fourth Embodiment

Figure 10:
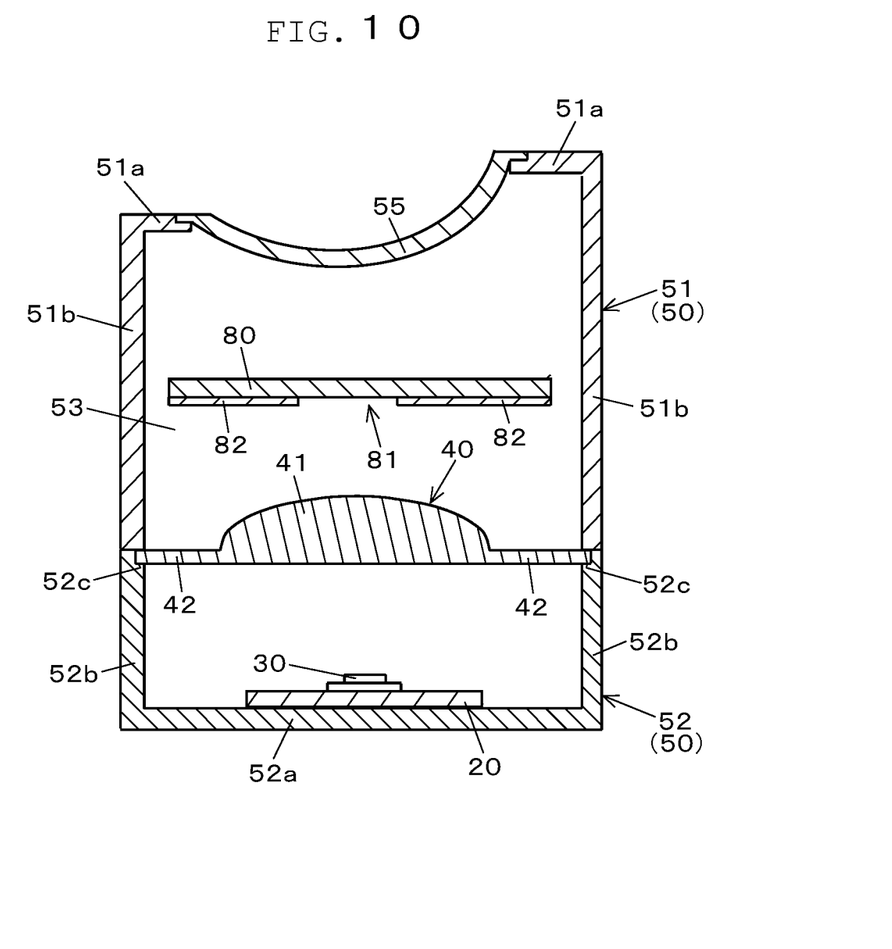
FIG. 10 is a cross-sectional view illustrating a light-emitting device according to a fourth embodiment of the invention.

Subsequently, referring now to FIG. 10, a fourth embodiment of the invention will be described, and the same or corresponding parts are designated by the same reference signs as those of the first to third embodiments described above, and detailed description thereof will be omitted. In the fourth embodiment, with the configuration of the third embodiment as a basic configuration, the design panel 70 and the diffusing sheet 58 are eliminated and, for example, a thin-plate-shaped diffusing member (diffusing means) 80 formed of a light-permeable synthetic resin of a milky white color is provided, and a display portion 81 having a predetermined display design and a background portion 82 forming the background of the display portion 81 are provided on a back surface of the diffusing member 80.

In this case, the diffusing member 80 is provided on the rear side of the cover 55 so as to be apart from the cover 55, has a function to diffuse the outside light incident on and entering the case body 50 through the cover 55, and is fixed to the case body 50 (the upper case 51) using the fixing means as needed. The display portion 81 has a design shape equivalent to the display portion 72 employed in the third embodiment, and the background portion 82 has the design shape equivalent to the background portion 73 employed in the third embodiment.

In the fourth embodiment as well, part of the outside light incident on and entering the case body 50 is attenuated when passing through the cover 55 and reaches the diffusing member 80, and part of the outside light reaching the diffusing member 80 is diffused (diffusely reflected) by the diffusing member 80, and hence with this configuration, the internal components such as the circuit board 20 and the light source 30, housed in the case body 50 are not illuminated. Therefore, the reflection of the internal components as a background on the windshield (reflecting member) 13 due to the outside light is prevented, the driver 14 is capable of visually identifying the red light-emitting image (the virtual image V) having no remaining image, so that the same effects and advantages as in the first to the third embodiments may be obtained.

Also, in the fourth embodiment, the example in which the background portion 82 is formed on the back surface of the diffusing member 80 has been described. However, the background portion 82 may be formed only on the surface of the diffusing member 80. At this time, the display portion 81 is formed on the front surface of the diffusing member 80 as a matter of course.

Figure 11:
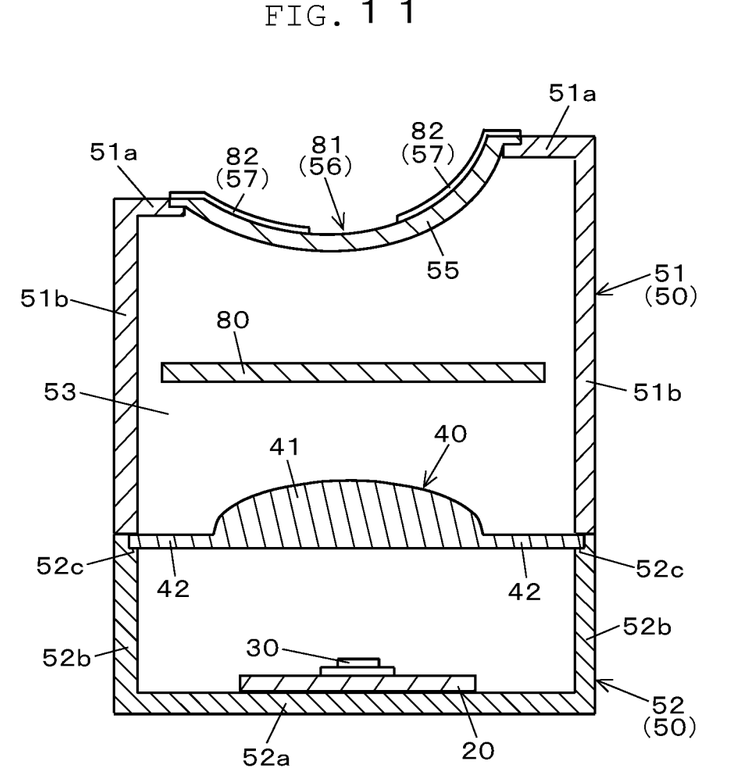
FIG. 11 is a cross-sectional view illustrating a light-emitting device according to a modification of the same fourth embodiment.
Figure 12:
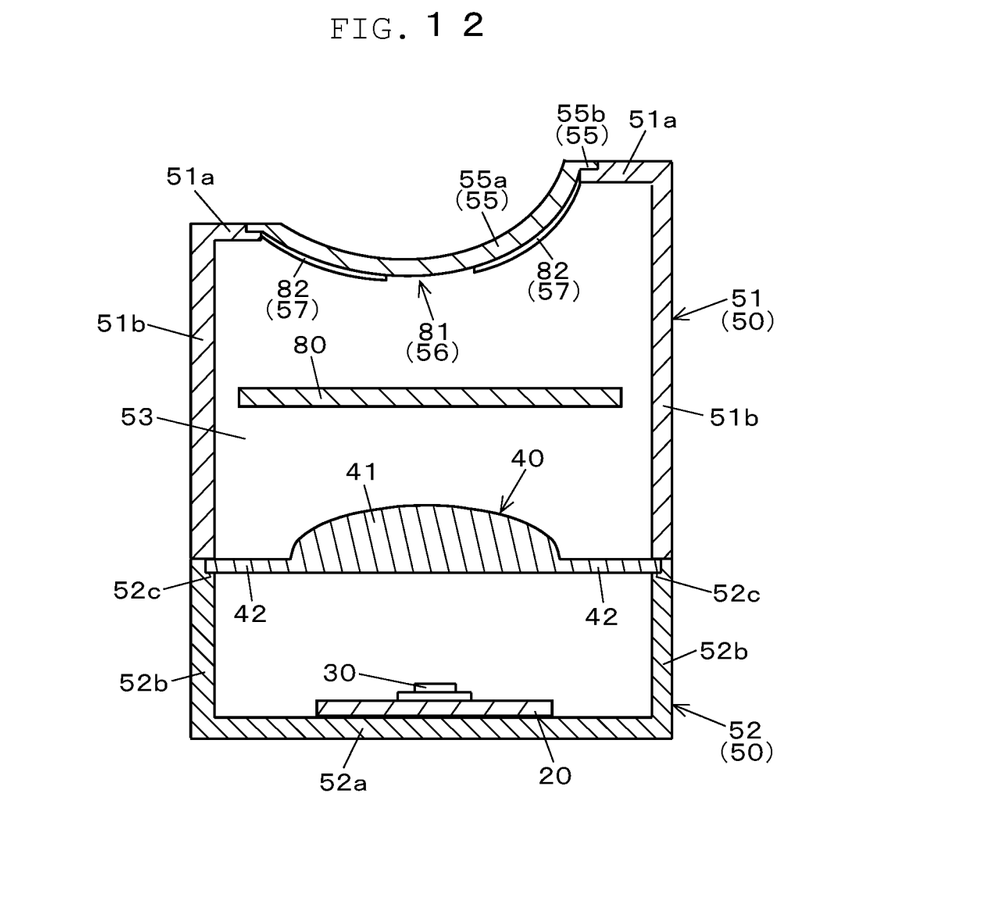
FIG. 12 is a cross-sectional view illustrating a light-emitting device according to another modification of the same fourth embodiment.
Figure 13:
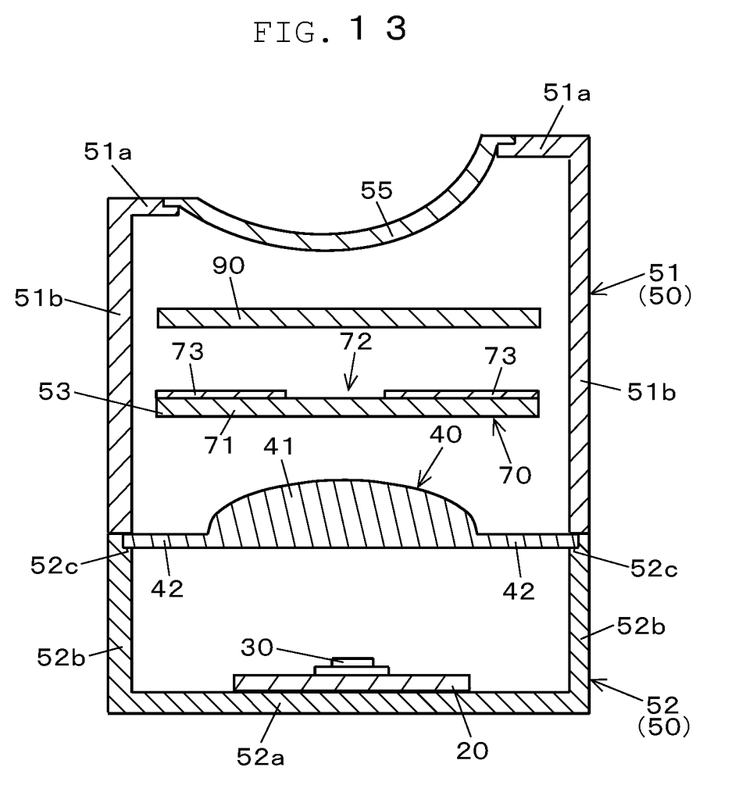
FIG. 13 is a cross-sectional view illustrating a light-emitting device according to a fifth embodiment of the invention.

As illustrated in FIG. 11 as a modification of the fourth embodiment, the background portion 82 corresponding to the background portion 57 employed in the first embodiment may be formed on the front surface of the cover 55 instead of forming the background portion 82 on the back surface of the diffusing member 80 provided on the rear side of the cover 55 so as to be apart from the cover 55. At this time, the display portion 81 corresponding to the display portion 56 employed in the first embodiment is formed in the area other than the background portion 82. As another modification of the fourth embodiment as illustrated in FIG. 12, it is needless to say that the background portion 82 and the display portion 81 may be provided on the back surface of the cover 55 (the curved surface portion 55*a*) instead of the front surface of the cover 55, and the diffusing member 80 may be provided between the cover 55 and the light source 30 so as to be apart from the cover 55.

Fifth Embodiment

Subsequently, referring now to FIG. 12, a fifth embodiment of the invention will be described, and the same or corresponding parts are designated by the same reference signs as those of the first to the fourth embodiments described above, and detailed description thereof will be omitted. In the fifth embodiment, with the configuration of the second embodiment as a basic configuration, the diffusing sheet 58 stuck on the back surface of the cover 55 is eliminated and, for example, a thin-plate-shaped diffusing member (diffusing means) 90 formed of a light-permeable synthetic resin having a milky white color is arranged on the front side (between the display member 70 and the cover 55) of the design panel 70.

The diffusing member 90 has a function to diffuse the outside light incident on and entering the case body 50 through the cover 55, is positioned between the design panel 70 and the cover 55, and is fixed to the case body 50 (the upper case 51) using the fixing means as needed. In the fifth embodiment as well, part of the outside light incident on and entering the case body 50 is attenuated when passing through the cover 55 and reaches the diffusing member 90, and part of the outside light reaching the diffusing member 90 is diffused (diffusely reflected) by the diffusing member 90, and hence with this configuration, the internal components such as the circuit board 20, the light source 30, and the display member 70 housed in the case body 50 are not illuminated. Therefore, the reflection of the internal components as a background on the windshield (the reflecting member) 13 due to the outside light is prevented, the driver 14 is capable of visually identifying the red light-emitting image (the virtual image V) having no remaining image, so that the same effects and advantages as in the first to the fourth embodiments may be obtained.

In the respective embodiments described above, the virtual image V as a red light-emitting image is displayed in association with the lighting of the light source 30. However, the virtual image V as a red light-emitting image may be flashed by flashing the light source 30, for example. In this manner flashing display of the virtual image V may enhance an effect of inviting the driver 14's attention.

In addition, in the respective embodiment described above, the example in which the virtual image V as a circular red light-emitting image is displayed in association with the lighting of the light source 30 when the vehicle speed exceeds the threshold value to remind the driver 14 to pay attention (raise a red flag) has been described. However, for example, a configuration in which the virtual image V is displayed (flashed) when the remaining amount of fuel is reduced beyond a predetermined value or when a distance between the vehicle in concern and a vehicle traveling in the front is reduced beyond a predetermined distance to remind the driver 14 to pay attention (raise a red flag) is also applicable.

In the respective embodiments described above, the example in which the lens shape of the convex lens 41 of the lens member 40 is a plano-convex lens shape in which the back side (the light source 30 side) is flat and the front side (the side of the front wall portion 51*a* of the case body 50) is a convex surface has been described. However, for example the convex lens 41 having a double-convex lens shape in which the light source 30 side and the front wall portion 51*a* side are both convex surfaces may be applied.

In the respective embodiments described above, the example in which the outgoing light L emitted from the light source 30 goes out toward the windshield 13 has been described. However, for example, a combiner film which causes the outgoing light L to be reflected desirably toward the driver 14 may be provided on the windshield 13, or a configuration in which the outgoing light L goes out toward a specific reflecting member different from the windshield 13 is also applicable.

INDUSTRIAL APPLICABILITY

The invention is applicable to a vehicular heads-up display device configured to cause outgoing light emitted from a light-emitting body to reflect on a windshield of a vehicle and cause a virtual image obtained by the reflection to be visually identified by a user of the vehicle.

REFERENCE SIGNS LIST

12 light-emitting device
13 windshield (reflecting member)
14 driver (user)
20 circuit board
30 light source (light-emitting body)
40 lens member
41 convex lens
50 case body
51 upper case
51*c* opening
52 lower case
53 space portion
54 display member
55 cover
55*a* curved surface portion
55*b* flange portion 56, 72, 81 display portion
57, 73, 82 background portion
58 diffusing sheet (diffusing means)
59 void portion
61 vehicle speed detecting means
62 control means
63 light source drive circuit
70 design panel (display member)
71 substrate
80, 90 diffusing member (diffusing means)
L outgoing light
[FIG. 4]
61 VEHICLE SPEED DETECTING MEANS
62 CONTROL MEANS
63 LIGHT SOURCE DRIVE CIRCUIT
30 LIGHT SOURCE

The invention claimed is:

1. A vehicular heads-up display device including:
a case body formed with an opening; and
a light-emitting body housed in the case body,
wherein an outgoing light from the light-emitting body is caused to go out toward the outside of the case body through the opening and reflected by a predetermined reflecting member so as to allow a user of a vehicle to visually identify a virtual image obtained by the reflection, the display device further comprising:
a cover disposed on the opening and formed of light-attenuating material, the cover having a curved surface portion; and
a diffusing means configured to diffuse outside light incident on and entering the case body through the cover between the light-emitting body and the cover,
wherein the diffusing means is provided between the light-emitting body and the cover so as to be apart from the cover,
the diffusing means is provided with a display portion having a predetermined display design and a background portion forming a background of the display portion,
the display portion is formed as a void portion where a printed layer which forms the background portion is not formed,
the diffusing means is provided right under the cover,
a lens member is provided between the light-emitting body and the diffusing means, includes a convex lens configured to focus the outgoing light emitted from the light-emitting body and a flange extending in the periphery of the convex lens, and
the flange is supported by the case body.

2. The vehicular heads-up display device according to claim 1, wherein the curved surface portion is arranged and configured such that light reflected therefrom is not directed toward a driver side.

* * * * *